No. 671,475. Patented Apr. 9, 1901.
B. FISHER.
CULTIVATOR.
(Application filed Aug. 22, 1900.)
(No Model.)
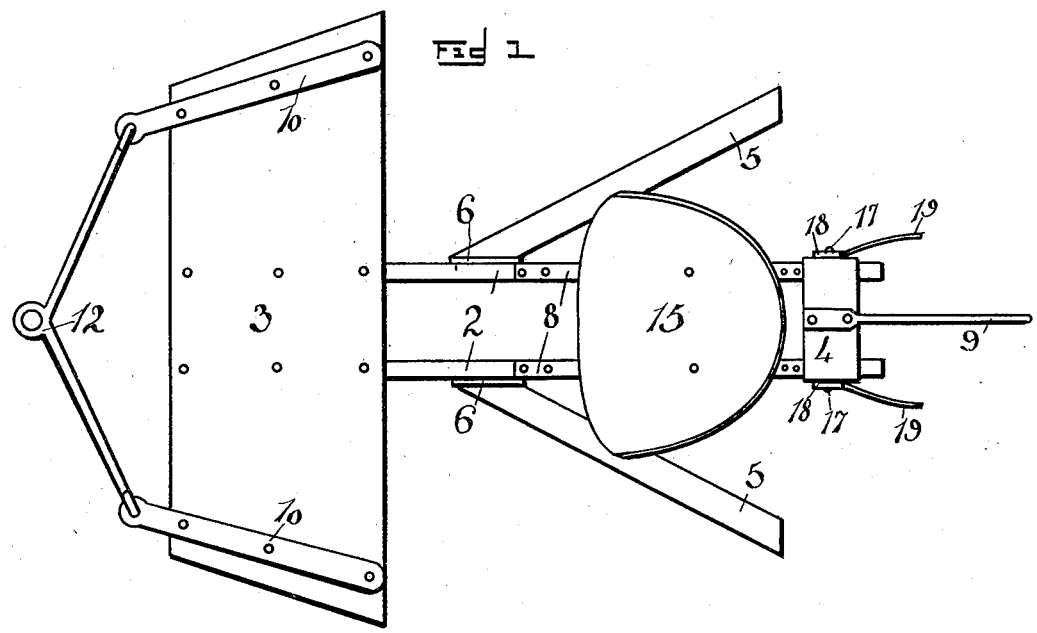
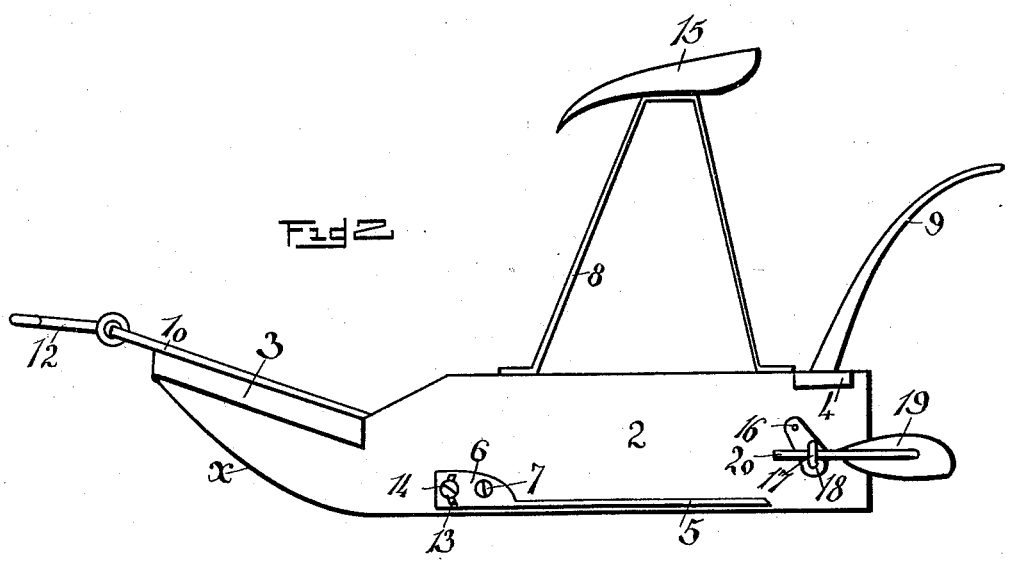
Witnesses:
M. Clarey.
Ethel Smith.
Inventor
Bailous Fisher.
by Geo. W. Sees
attorney.

UNITED STATES PATENT OFFICE.

BAILOUS FISHER, OF CARSON, IOWA.

CULTIVATOR.

SPECIFICATION forming part of Letters Patent No. 671,475, dated April 9, 1901.

Application filed August 22, 1900. Serial No. 27,664. (No model.)

*To all whom it may concern:*

Be it known that I, BAILOUS FISHER, residing at Carson, in the county of Pottawattamie and State of Iowa, have invented certain useful Improvements in Cultivators; and I do hereby declare that the following is a full, clear, and exact description of the invention, such as will enable others skilled in the art to which it appertains to make and use the same, reference being had to the accompanying drawings, which form a part of this specification.

This invention relates to a novel improvement in cultivators.

The object of my invention is to provide a cultivator especially adapted to be used in cultivating listed corn, the aim being to provide a cultivator so simple in its construction that a child may operate the same.

In the accompanying drawings I have shown in Figure 1 a top view of a cultivator embodying my invention, while Fig. 2 shows a side elevation thereof.

In carrying out the aim of my invention I design a cultivator which in front is provided with a shield of a suitable width, so that in being carried across the field this shield engages and crushes the clods adjacent to the plants. Following this crusher and penetrating a suitable distance at any desired angle into the earth are two diverging cutter-knives intended to cut the roots of the weeds growing adjacent to the cultivated plants, while following the weed-cutting knives are two shovels adjustably positioned, so that the earth may be properly banked around the growing plants.

In carrying out this object I construct a cultvator comprising two simple runners 2 2, which in front have the usual runner curve, as is shown at *x* in Fig. 2, and upon these front runners is positioned at an angle a clod-crushing shield 3, from which extend two bars 10, holding an iron carrier 12, to which the singletree is connected. Upon the rear the two runners are secured by means of a brace 4, from which extends a suitable operating-handle 9, as is shown. Extending upward from the runners 2 2 at a suitable point are the seat-brackets 8 8, supporting an ordinary seat 15, so positioned that the shield 3 offers a foot-rest for the operator upon the seat 15. At two points upon the sides the runners 2 2 are provided with screws 7, which act as a pivot-support for a diverging knife 5 of a suitable length, so that it will sweep at an angle through the earth a suitable distance to detach the weed-stems from the roots within the ground. These knives 5 are provided with shanks 6, having radial slots 13, through which slots pass supporting-screws 14, as is shown in Fig. 2. Two of these knives 5 are used, both being supported in like manner. By means of the pivoted support and adjusting-screw 14 these knives may be tilted upward or downward. In sweeping through the earth these knives loosen the earth while severing the roots of the weeds from the stems. The weeds remain standing, even after the knife has passed through, for the reason that the knife passes through below the surface of the earth. The weeds finally wilt and drop over. Trailing behind the knives are the shovels 19, which are of a suitable size and capacity and are provided with a stem 20, extending through an eye 17, which eye in turn extends through a holder 18 and is secured upon the rear by means of an ordinary nut. To keep the holder 18 from revolving, an ordinary wooden pin 16 is used, so that in case the shovel strikes a stone or fixed obstruction the pin 16 may be broken to permit the movement of the shovel 19, as is usual in cultivator construction.

The operator in sitting upon the seat can readily control the apparatus, and in turning around it is simply necessary for the operator to place his weight upon the foot-board 13, so that the apparatus will rock on the curved frame and then turn the horse, so that a prompt turn may be made. The device is simple in construction and readily operated.

Having thus described my said invention, what I claim as new, and desire to secure by United States Letters Patent, is—

In a cultivator of the character described the combination with two runners, of a laterally-projecting clod-crushing shield secured to said runners, an adjustably-supported knife projecting laterally from each runner, a frangibly-supported holder secured to each of said runners and an adjustably-held trailing shovel extending from each of said holders as and for the purpose set forth.

BAILOUS FISHER.

Witnesses:
IRA R. STETT,
J. F. REID.